Sept. 6, 1932.  A. B. GARDELLA  1,876,286
BRAKE MECHANISM
Filed Dec. 9, 1929  2 Sheets-Sheet 1

INVENTOR
ALBERT B. GARDELLA
BY
ATTORNEY

INVENTOR
ALBERT B. GARDELLA
BY John A. Bommhardt
ATTORNEY

Patented Sept. 6, 1932

1,876,286

UNITED STATES PATENT OFFICE

ALBERT B. GARDELLA, OF CLEVELAND, OHIO

BRAKE MECHANISM

Application filed December 9, 1929. Serial No. 412,793.

This invention relates to brakes and particularly to brake mechanism for the equalization of four wheel brakes.

The salient object of this invention is to produce an improved braking mechanism for motor vehicles in which a given movement of the foot brake will cause a certain extent of movement of the brake rod causing the brake shoes to move towards the brake drums.

Another object is to provide an equalizer that will allow an equal amount of pressure on each brake drum regardless of the amount or thickness of the brake shoe or lining.

In carrying out the above objects the brakes are automatically adjusted for wear without altering in any way the mechanical adjustment between the operating lever and the brake shoe. In other words, when the brakes are newly lined there will be a certain leverage between the brake operating lever and the brake shoe and after the lining has worn to any extent, the leverage during this further separation will be exactly or approximately the same as when the brake lining was new.

Another object of the invention is to provide a simple and efficient braking mechanism of few parts.

Other objects will be apparent from the following description taken in connection with the drawings which form a part of the specification and in which:—

Figure 1:
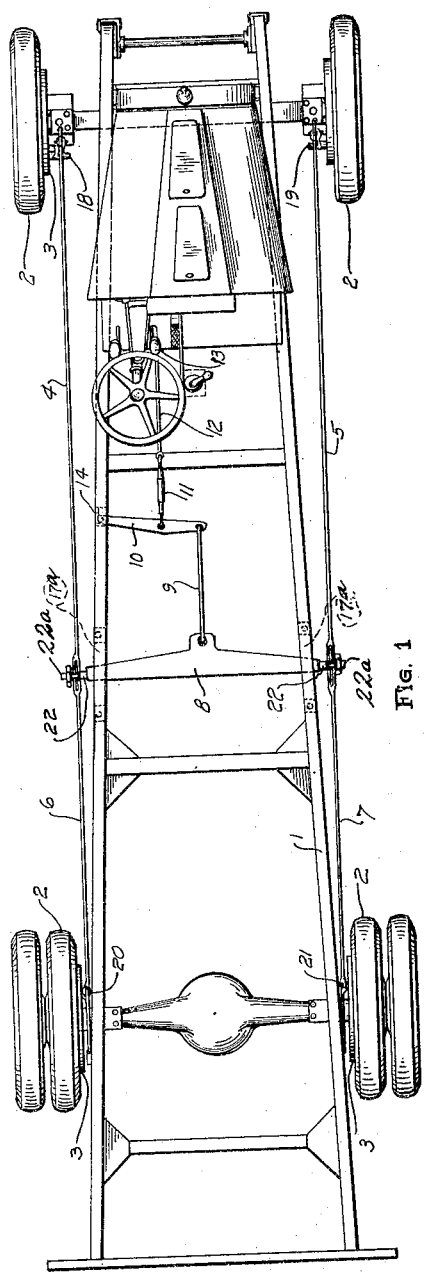
Fig. 1 is a plan view of a chassis showing the braking and equalizing system.
Figure 2:
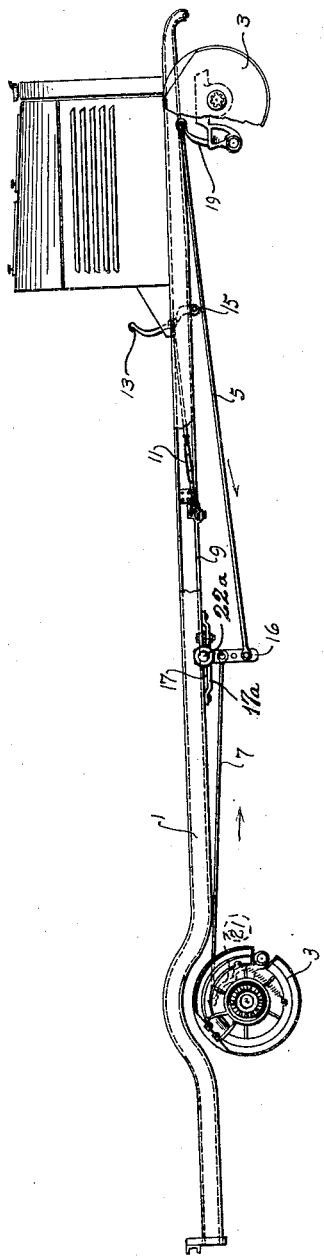
Fig. 2 is a side elevation of Fig. 1.
Figure 3:
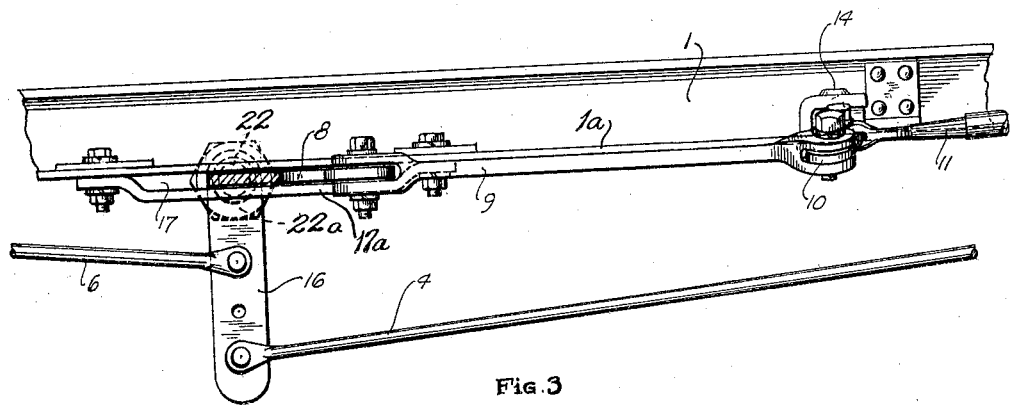
Fig. 3 is an enlarged partial view showing the equalizer beam in a neutral position.
Figure 4:
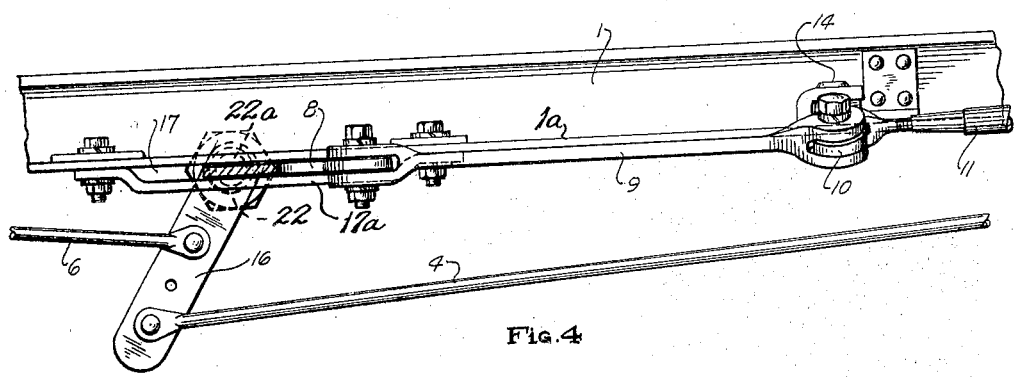
Fig. 4 is the same as Fig. 3 except that the equalizer beam is shown in braking position.
Figure 5:
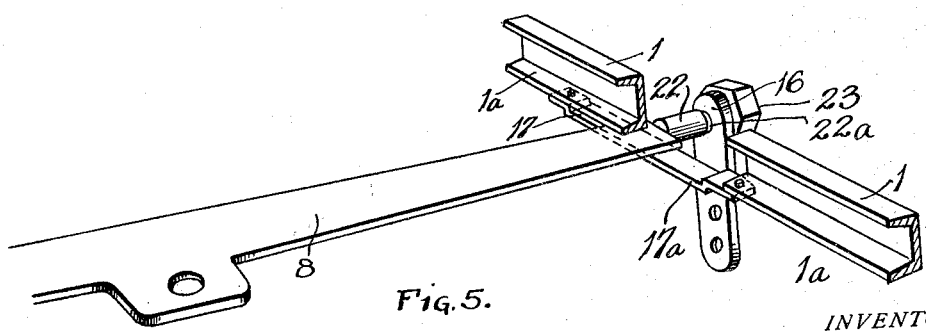
Fig. 5 is a perspective view of one end of the equalizer beam, brake rod arm, guide and broken section of channel side member.

Referring to the drawings, 1 represents the side members of the chassis. The wheels 2 are shown and the brake drums 3, and the front brake rods 4 and 5 and the rear brake rods 6 and 7 are shown extending forwardly and rearwardly from arms 16 depending from the equalizer beam 8 to the middle of which is suitably attached the connecting link 9 at the opposite end of which is secured the free end of an equalizer lever 10. Slightly to one side of the middle of the lever 10, and attached by use of the turnbuckle 11, is a foot brake rod 12 which is operated by the foot pressure on the foot pedal lever 13.

The equalizer lever 10, which pivots at 14 to side member 1 of the chassis, is itself operated by the movement forward of the foot brake rod 12 which is attached centrally to the foot pedal lever 13 which in turn pivots at 15 as it is pushed forward by the foot pressure; and this forward movement of the equalizer lever 10 causes the connecting link 9 to draw the equalizer beam 8 forwardly thus swinging the brake rod arms 16, which hang from the ends of the beam 8, causing the front brake rods 4 and 5 to be drawn rearwardly as the equalizer beam 8 slides forward in the slot 17, and this also causes rear brake rods 6 and 7 to move forward at the same time. These rods 4, 5, 6 and 7 being connected to the brake arms 18, 19, 20 and 21 respectively cause the said arms 18 and 19 to move rearward and the arms 20 and 21 to move forward thus causing the brake shoe to contact with the brake drum 3 in a known manner.

The equalizer beam has at its ends rounded enlargements 22 of greater diameter than the width of the slots 17. These enlargements prevent excessive endwise shift of the beam 8 but are spaced sufficiently from the outside edges of the frame 1 and guide 17a to permit the beam 8 to draw a little farther forward in the slot on one side than on the other, as when the brake lining on one side is worn more than on the other. The brake rod arms 16 are hung loosely on the reduced ends 22a of the enlargements 22 and are held in position by nuts 23. As the foot brake 13 is applied the arms 16 swing to apply the front and rear brakes on the respective sides, the beam 8 drawing or sliding in the slots 17 accordingly.

Under all conditions of the brake lining therefore until it is fully worn out the equalization of the brake is always assured.

It is understood that this invention is not limited to the exact details of the construction shown as it will be apparent that changes may be made without departing from the spirit or scope of the invention.

I claim:—

1. The combination with the frame of a vehicle having front and rear wheel brakes, and also having guide slots at opposite sides of the frame, of an equalizing beam extending across the frame and having flattened portions extending through and slidable and non-rotatable in said slots, lever arms loosely pivoted on the ends of the beam outside of the frame, front and rear brake rods connected to said arms, and an operating lever connected to said beam to shift the same.

2. The combination stated in claim 1, the flattened portions of the beam extending through the slots and having enlargements outside of the slots to prevent endwise shift of the beam.

In testimony whereof, I do affix my signature.

ALBERT B. GARDELLA.